UNITED STATES PATENT OFFICE.

HENRI J. E. HENNEBUTTE, OF ANGLET, DEPARTMENT OF BASSES-PYRÉNÉES, FRANCE.

PROCESS OF TREATING AMMONIACAL SALTS.

SPECIFICATION forming part of Letters Patent No. 253,045, dated January 31, 1882.

Application filed December 1, 1881. (No specimens.) Patented in France June 15, 1881.

*To all whom it may concern:*

Be it known that I, HENRI JOSEPH ERNEST HENNEBUTTE, a citizen of France, residing at Anglet, in the Department of the Basses-Pyrénées and Republic of France, have invented new and useful Improvements in Processes for Treating Ammoniacal Salts, of which the following is a specification.

This invention relates to an improved process for treating ammoniacal salts, the object of which is to prevent the formation of froths and foams, and which consists in eliminating by means of acid the carbonates which may give rise to the formation of carbonate of lime in the treatment of liquids containing fixed salts of ammonia, which it is desired to decompose by lime.

It is notably during the regeneration of the residuary waters coming from the manufacture of soda by ammonia that the formation of the froths and foams renders the treatment of the liquids very difficult. The treatment of these residuary waters implies two very distinct features: First, they are first heated in order to eliminate therefrom the carbonate of ammonia which they contain, and also for the purpose of restoring to the form of bicarbonate of ammonia, which distills, the bicarbonate of soda which they hold in solution; second, they have then added to them lime, in order to decompose the fixed ammoniacal salts which they contain, and to disengage therefrom the hydrate of ammonia. It is during this second period that the froths are produced, and having recognized that in the operations of this kind they were due to the presence of carbonate of lime, recourse is had to the following process: Provided care be taken to keep the lime before it is used from contact with the air, the formation of froths arises only from the reaction of the carbonate of ammonia on the lime which it carbonates. Very feeble quantities of carbonate of lime give rise to a production of intense frothings, and as the first phase of distillation is never carried far enough to eliminate all the carbonate of ammonia from the liquors, it follows that the serious inconvenience before referred to is inevitable, which necessitates a recourse to froth-spoons or some special arrangement, and also conducting the experiments with an uneconomical slowness. The following method is thus the one which it is advantageous to employ: When the first phase of the operations is finished—that is to say, at the moment when the carbonate of ammonia contained in the residuary waters has been eliminated by distillation as completely as possible—before proceeding to the second phase of the operation and adding lime thereto, they are acidulated by a small quantity of acid (preferably chlorhydric acid) until the last traces of carbonate of ammonia be decomposed and an acid reaction is apparent on litmus-paper. Some drops of acid generally suffice. Under these conditions the treatment of the residuary waters can be carried on in very simple apparatus with entire security.

As is seen from the above description, the method comprises the elimination by means of acid of the carbonates, which may give rise to the formation of carbonate of lime in the treatment of liquids containing fixed salts of ammonia which it is desired to decompose by lime obtained from the manufacture of soda by ammonia.

What I claim as new, and desire to secure by Letters Patent, is—

1. The herein-described process of treating ammoniacal salts, which consists in heating the liquids containing the same, acidulating the same, and then adding lime thereto in order to decompose the fixed ammoniacal salts, substantially as set forth.

2. The herein-described process of preventing the formation of froths and foams in ammoniacal liquors by adding thereto, after the same have been heated, a slight quantity of acid, in order to eliminate the carbonates which may give rise to the formation of carbonate of lime, substantially as set forth.

3. The herein-described process of eliminating by means of acid the carbonates which tend to cause the formation of carbonate of lime in the treatment of liquids containing fixed salts of ammonia, which it is desired to decompose by lime, substantially as and for the purpose set forth.

In testimony whereof I have hereunto set my hand and seal in the presence of two subscribing witnesses.

HENRI JOSEPH ERNEST HENNEBUTTE. [L. S.]

Witnesses:
RENÉ FRANCK,
ELYSÉE LÉON.